(12) United States Patent
Fujimaki et al.

(10) Patent No.: US 6,516,117 B1
(45) Date of Patent: Feb. 4, 2003

(54) GRATING AND METHOD AND APPARATUS FOR FORMING SAME

(75) Inventors: Makoto Fujimaki, 8 Yamadera, Kushigatacho, Nakakoma-gun, Yamanashi-ken (JP); Yoshimichi Ohki, Tokyo-to (JP); John L. Brebner, Province de Qebec (CA); Sjoerd Roorda, Province de Quebec (CA)

(73) Assignees: Makoto Fujimaki, Yamanashi-ken (JP); Waseda University, Tokyo-To (JP); Universite de Montreal, Montreal (CA)

( * ) Notice: Subject to any disclaimer, the term of this patent is extended or adjusted under 35 U.S.C. 154(b) by 79 days.

(21) Appl. No.: 09/631,837

(22) Filed: Aug. 3, 2000

(30) Foreign Application Priority Data

Aug. 6, 1999 (JP) ............................................ 11-224272

(51) Int. Cl.⁷ ................................................. G02B 6/34
(52) U.S. Cl. ......................... 385/37; 385/123; 385/124
(58) Field of Search ............................. 385/37, 123, 124

(56) References Cited

U.S. PATENT DOCUMENTS

| | | | | |
|---|---|---|---|---|
| 4,401,367 A | * | 8/1983 | Grantham et al. | 350/162.22 |
| 4,815,800 A | * | 3/1989 | Chern et al. | 350/3.7 |
| 4,938,836 A | | 7/1990 | Carenco et al. | 156/605 |
| 5,406,080 A | | 4/1995 | Friedheim | 216/60 |
| 5,581,639 A | | 12/1996 | Davies et al. | 385/10 |
| 6,091,870 A | | 7/2000 | Eldada | 385/131 |
| 6,115,518 A | | 9/2000 | Clapp | 385/37 |
| 6,160,944 A | * | 12/2000 | Payne et al. | 385/129 |

FOREIGN PATENT DOCUMENTS

| | | | |
|---|---|---|---|
| EP | 0 579 524 | 1/1994 | 385/37 |
| GB | 2 316 185 | 2/1998 | 385/37 |
| JP | 02 106987 | 7/1990 | 385/37 |
| WO | 99/30189 | 6/1999 | 385/37 |

OTHER PUBLICATIONS

M. Verhaegen et al., "Ion implantation–induced strong photosensitivity in high–purity fused silica: Correlation of index changes with VUV color centers," Appl. Phys. Lett. 68 (22), May 27, 1996, pp. 3084–3086.

P.W. Leech et al., "Low loss channel waveguides fabricated in fused silica by germanium ion implantation," Electronics Letters, Jul. 20, 1995, vol. 31, No. 15, pp. 1238–1241.

J.A. Rogers et al., "Using microcontact printing to generate amplitude photomasks on the surfaces of optical fibers: A method for producing in–fiber gratings," Appl. Phys. Lett. 70 (1), Jan. 6, 1997, pp. 7–9.

A.L. Tchebotareva et al., "Effect of proton implantation on the photosensitivity of SMF–28 optical fiber," Nuclear Instruments and Methods in Physics Research B 148 (1999), pp. 687–691.

(List continued on next page.)

Primary Examiner—Brian Healy
(74) Attorney, Agent, or Firm—Young & Thompson

(57) ABSTRACT

A grating formation method comprises the steps of accelerating ions; causing the accelerated ions to pass through a mask having a shape corresponding to the grating; and implanting the ions, which have passed through the mask, into the core, to form refractive index-variation portions for the grating in the core. The other formation method comprises the steps of accelerating ions, converging an ion beam formed of the accelerated ions, to make a beam diameter identical with or smaller than a width of refractive index-variation portions in a direction of the central axis of the optical waveguide so as to provide a converged ion beam; and intermittently irradiating the converged ion beam to the core, while moving an irradiation position in the direction of the central axis, to implant the ions into the core so as to form the refractive index-variation portions in the core.

24 Claims, 6 Drawing Sheets

OTHER PUBLICATIONS

E.R. Schineller et al., "Optical Waveguides Formed by Proton Irradiation of Fused Silica," Journal of Optical Society of America, vol. 59, No. 9, Sep. 1968, pp. 1171–1176.

A.B. Faik et al., "Refractive Index Changes Formed by $N^+$ Implants in Silica," Radiation Effects, 1986, vol. 98, pp. 233–241.

C.M. Johnson et al., "Thermal annealing of implantation–induced compaction for improved silica waveguide performance," Appl. Phys. Lett. 69 (7), Aug. 12, 1996, pp. 984–986.

E.P. EerNisse, "Compaction of ion–implanted fused silica," Journal of Applied Physics, vol. 45, No. 1, Jan. 1974, pp. 167–174.

H.M. Presby et al., "Refractive index variations in proton–bombared fused silica," Applied Physics Letters, vol. 24, No. 10, May 15, 1974, pp. 511–513.

K. Fukumi et al., "Structural relaxation of MeV ion–implanted silica glasses by thermal annealing," Nuclear Instruments and Methods in Physics Research B 141 (1998), pp. 620–624.

K.O. Hill et al., "Bragg gratings fabricated in monomode photosensitive optical fiber by UV exposure through a phase mask", Appl. Phys. Lett. 62 (10), Mar. 8, 1993, pp. 1035–1037.

J. Albert et al., "Maskless writing of submicrometer gratings in fused silica by focused ion beam implantation and differential wet etching", Appl. Phys. Lett. 63 (17), Oct. 25, 1993, pp. 2309–2311.

* cited by examiner

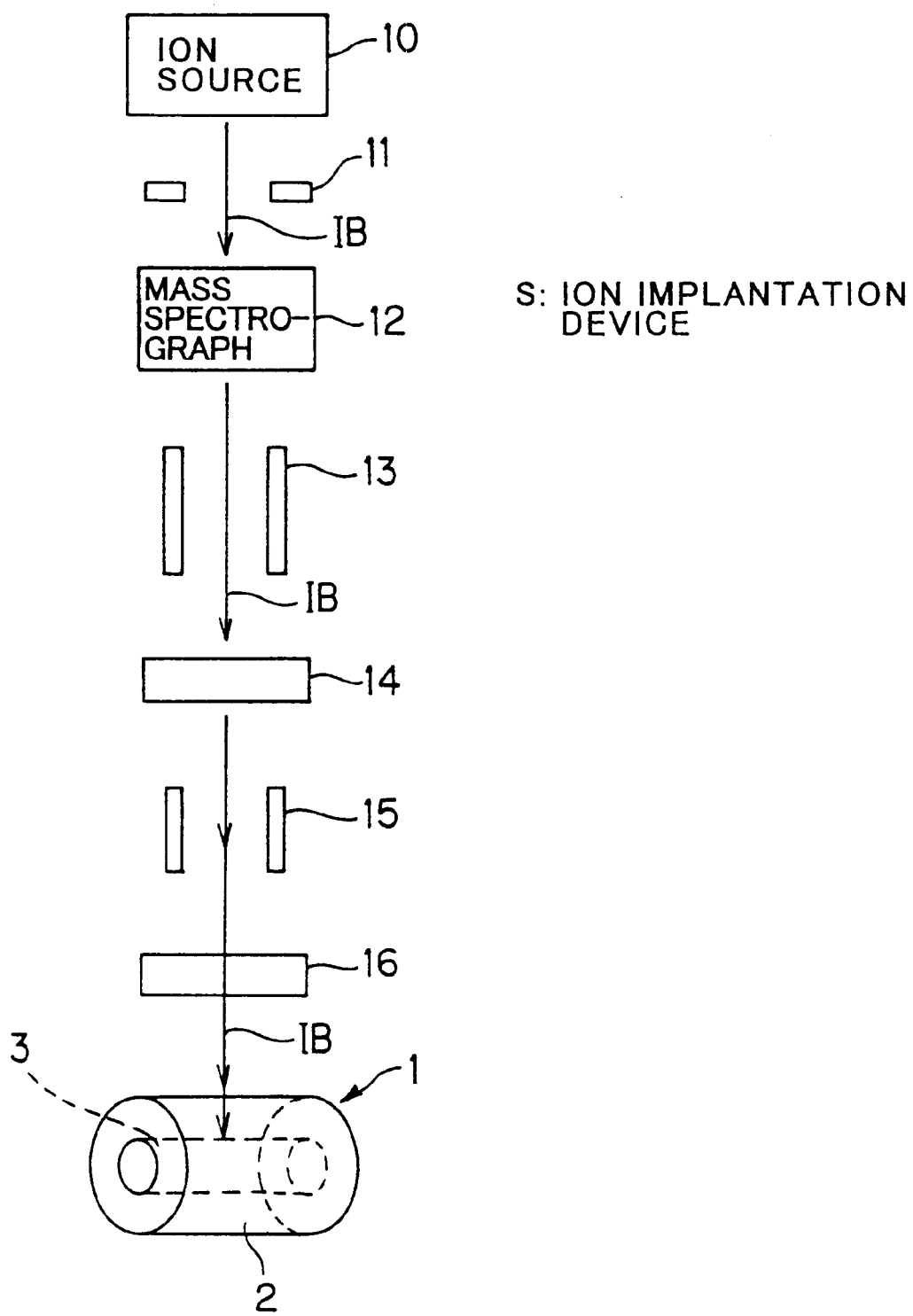

GRATING AND METHOD AND APPARATUS FOR FORMING SAME

BACKGROUND OF THE INVENTION

1. Field of the Invention

The present invention relates to a grating and a method and apparatus for forming the grating, and more particularly, to the grating that is formed in the core locating in the center of the optical waveguide and the method and apparatus for forming such a grating in the above-mentioned core.

2. Description of the Related Art

In general, a grating, which is formed in a core of an optical waveguide, may be classified into a Bragg grating and a long-period grating. The term "optical waveguide" in the following description includes an optical fiber.

An outline of these gratings will be described. The Bragg grating has a grating period, which is substantially the same as the wavelength of light used in an optical communication utilizing the above-mentioned optical waveguide. The Bragg grating serves as a mirror that reflects only the light having the specific wavelength, which satisfies the Bragg conditions relative to the grating period.

There occurs no propagation of the light reflected by the mirror to the downstream side of the grating in the travelling direction of the light. Accordingly, the Bragg grating may be used as an optical filter for blocking the light having a prescribed wavelength.

Expansion or contraction of a portion of the optical waveguide including the above-mentioned grating, due to heat and/or external vibration, causes its grating period to expand or contract simultaneously. Consequently, there occurs change in wavelength of light, which satisfies the Bragg conditions. The Bragg grating may be used as a temperature sensor or a vibration sensor utilizing the above-mentioned change detected.

On the contrary, the other kind of grating, i.e., the long-period grating has a grating period, which is extremely longer than the wavelength of light used in the optical communication utilizing the optical waveguide, unlike the Bragg grating. Consequently, the long-period grating provides coupling of certain two optical propagation modes. The long-period grating may therefore be used as a mode coupler.

In case where the optical propagation mode of light having a certain wavelength and a cladding mode (i.e., a mode in which light is irradiated outside the optical waveguide) are coupled to each other by the above-mentioned long-period grating, the long-period grating may be used as an optical filter for irradiating light having the certain wavelength outside the optical waveguide.

In addition, the long-period grating may also be used as a temperature sensor or a vibration sensor in the same manner as in the Bragg grating.

With respect to a formation method of the grating in the core, there has conventionally been adopt a method of irradiating a laser beam to the core so as to form the grating utilizing refractive index-variation of the core due to the irradiation of the laser beam.

However, in the conventional method of irradiating the laser beam to the core to form the refractive index-variation portions of which the grating is formed, it is impossible to form any grating in an optical fiber having a core formed of material in which refractive index-variation does not occur even when the laser beam is irradiated, thus causing a problem.

The above-mentioned problem is serious in view of the fact that material for forming the optical fiber mostly has a low photosensitivity to light.

When the grating is formed by irradiating the laser beam to the optical fiber having the core, which is formed of material having a high photosensitivity to the laser beam, in the conventional manner, it is necessary to apply hydrogen loading to the optical fiber, for example, at room temperature under high pressure for a period of time of from 10 days to two weeks, in order to increase the photosensitivity of the core. The formation process therefore becomes complex and the cost of the product increases, thus causing problems.

In addition, in the conventional formation method, only small variation in refractive index occurs in practice in the refractive index-variation portions formed, due to the low photosensitivity of material for the core to the laser beam, thus making it hard to obtain the grating in an effective manner.

The low photosensitivity of the material for the core to the laser beam requires maintenance of a high condensing property and a high irradiation power during the irradiation of the laser beam. The conventional method is therefore not suitable for mass production of the grating.

In the conventional method, formation of a plurality of point defects in the core by the laser beam irradiation causes the refractive index to change, thus shortening the service life of the grating.

SUMMARY OF THE INVENTION

An object of the present invention, which was made to solve the above-described problems, is therefore to provide a grating, which is formed in a core of an optical waveguide including an optical fiber and a high efficiency and a long service life, as well as a method and apparatus for forming the grating in an easy and effective manner.

In order to attain the aforementioned object, a grating formed in a core of an optical waveguide comprises a plurality of refractive index-variation portions that are formed in said core by implanting accelerated ions into said core.

The grating is composed of the plurality of refractive index-variation portions, which are formed by implanting ions into the core. It is therefore possible to increase refractive index variation rate in the ion-implanted portions. A high efficiency of the grating can be provided by improving optical reflectance or coupling efficiency between modes in the refractive index-variation portions.

Change in refractive index utilizing the ion implantation is principally caused by densification induced by the ion implantation in material for the optical waveguide. The induced densification is stable relative to heat in comparison with the point defects that are induced by the laser beam. It is therefore possible to increase the service life of the grating and impart a high temperature resistance to it.

The refractive index-variation portions may be spaced apart from each other in a direction of the central axis of said optical waveguide and the spacing and the number of said refractive index-variation portions may correspond to properties, which are to be imparted to said grating.

According to such a feature, it is possible to obtain the grating having a high efficiency with a simple structure.

Each of said plurality of refractive index-variation portions may be formed in a plane perpendicular to the central axis of said optical waveguide in said core.

According to such a feature, it is possible to obtain the grating having a high efficiency with a simple structure.

The grating may be a Bragg grating. In this case, it is possible to improve the efficiency as the Bragg grating.

The grating may be a long-period grating. In this case, it is possible to improve the efficiency as the long-period grating.

A method of the present invention for forming a grating in a core of an optical wave guide, comprises:
- an acceleration step for accelerating ions to provide accelerated ions;
- a passing step for causing said accelerated ions to pass through a mask having a shape corresponding to said grating to be formed; and
- an implantation step for implanting the ions, which have passed through said mask, into said core, to form a plurality of refractive index-variation portions for said grating in said core.

In the above-mentioned method, the grating is composed of the plurality of refractive index-variation portions, which are formed by implanting the accelerated ions into the core. It is therefore possible to form effectively the grating even in the optical waveguide having the core, which has a low photosensitivity to the laser beam or no photosensitivity to it.

The grating is composed of the plurality of refractive index-variation portions where the refractive index variation rate is increased. As a result, a high efficiency of the grating can be provided by improving optical reflectance or coupling efficiency between modes in the refractive index-variation portions. In addition, it is possible to increase the service life of the grating and impart a high temperature resistance to it.

Another method of the present invention for forming a grating in a core of an optical wave guide, comprises:
- an acceleration step for accelerating ions to provide accelerated ions;
- a convergence step for converging an ion beam, which is formed of said accelerated ions, to make a beam diameter of said ion beam identical with or smaller than a width of refractive index-variation portions for said grating in a direction of the central axis of said optical waveguide so as to provide a converged ion beam; and
- an implantation step for intermittently irradiating said converged ion beam to said core, while moving an irradiation position in the direction of said central axis, to implant said ions into said core so as to form said plurality of refractive index-variation portions in said core.

In the other method mentioned above, the grating is composed of the plurality of refractive index-variation portions, which are formed by implanting the accelerated ions into the core. It is therefore possible to form effectively the grating even in the optical waveguide having the core, which has a low photosensitivity to the laser beam or no photosensitivity to it.

The grating is composed of the plurality of refractive index-variation portions where the refractive index variation rate is increased. As a result, a high efficiency of the grating can be provided by improving optical reflectance or coupling efficiency between modes in the refractive index-variation portions. In addition, it is possible to increase the service life of the grating and impart a high temperature resistance to it.

In the above-mentioned implantation step, said ions may be implanted so that said refractive index-variation portions are spaced apart from each other in the direction of the central axis of said optical waveguide and the spacing and the number of said refractive index-variation portions corresponds to properties, which are to be imparted to said grating.

According to such a feature, it is possible to obtain the grating having a high efficiency with a simple structure.

In the above-mentioned implanting step, said ions may be implanted so that each of said plurality of refractive index-variation portions is formed in a plane perpendicular to the central axis of said optical waveguide in said core.

According to such a feature, it is possible to obtain the grating having a high efficiency with a simple structure.

In the above-mentioned method of the present invention, the grating to be formed may be a Bragg grating. In this case, it is possible to form the Bragg grating having high efficiency even in the core formed of any material.

In the above-mentioned method of the present invention, the grating to be formed may be a long-period grating. In this case, it is possible to form the long-period grating having high efficiency even in the core formed of any material.

In the above-mentioned method of the present invention, the ions to be implanted may comprise protons.

With respect to this feature, it is necessary to cause the ions to pass through the cladding of the optical waveguide to reach the core, in order to form the refractive index-variation portions in the core by means of ion implantation. Protons have a penetration depth, by which the ions penetrate into material during the ion implantation step, which depth is largest among all the ions under the constant accelerated energy. It is therefore possible to cause the ions to reach the core by small acceleration energy, thus permitting to form effectively the grating.

In the above-mentioned method of the present invention, the ions to be implanted may comprise helium ions.

With respect to this feature, the helium ions have the next largest penetration depth to that of protons. It is therefore possible to cause the ions to reach the core by small acceleration energy, thus permitting to form effectively the grating.

Helium ion has a weight, which is four times as much as the weight of proton. Consequently, variation in refractive index caused during the helium ion implantation step is about four times as much as that in refractive index caused during the proton implantation step. It is therefore possible to obtain the refractive index-variation portions having a prescribed rate in change in refractive index by a small amount of ions implanted, thus permitting to effectively form the grating.

In addition, helium ion has an excessively low reactivity. It is therefore possible to form the refractive index-variation portions without causing degradation of the core.

An apparatus of the present invention for forming a grating in a core of an optical wave guide, comprises:
- an acceleration device such as an accelerating electrode for accelerating ions to provide accelerated ions;
- a passing device such as a scanning device for causing said accelerated ions to pass through a mask having a shape corresponding to said grating to be formed; and
- an implantation device such as a mask for implanting the ions, which have passed through said mask, into said core, to form a plurality of refractive index-variation portions for said grating in said core.

In the above-mentioned apparatus of the present invention, the grating is composed of the plurality of refractive index-variation portions, which are formed by implanting the accelerated ions into the core. It is therefore possible to form effectively the grating even in the optical waveguide having the core, which has a low photosensitivity to the laser beam or no photosensitivity to it.

The grating is composed of the plurality of refractive index-variation portions where the refractive index variation rate is increased. As a result, a high efficiency of the grating can be provided by improving optical reflectance or coupling efficiency between modes in the refractive index-variation portions. In addition, it is possible to increase the service life of the grating and impart a high temperature resistance to it.

Another apparatus of the present invention for forming a grating in a core of an optical wave guide, comprises:

- an acceleration device such as an accelerating electrode for accelerating ions to provide accelerated ions;
- a convergence device such as a quadrupole lens for converging an ion beam, which is formed of said accelerated ions, to make a beam diameter of said ion beam identical with or smaller than a width of the refractive index-variation portions for said grating in a direction of the central axis of said optical waveguide so as to provide a converged ion beam; and
- an implantation device such as a scanning electrode for intermittently irradiating said converged ion beam to said core, while moving an irradiation position in the direction of said central axis, to implant said ions into said core so as to form said plurality of refractive index-variation portions in said core.

In the other apparatus mentioned above of the present invention, the grating is composed of the plurality of refractive index-variation portions, which are formed by implanting the accelerated ions into the core. It is therefore possible to form effectively the grating even in the optical waveguide having the core, which has a low photosensitivity to the laser beam or no photosensitivity to it.

The grating is composed of the plurality of refractive index-variation portions where the refractive index variation rate is increased. As a result, a high efficiency of the grating can be provided by improving optical reflectance or coupling efficiency between modes in the refractive index-variation portions. In addition, it is possible to increase the service life of the grating and impart a high temperature resistance to it.

With respect to the above-mentioned apparatus of the present invention, in said implantation device, said ions may be implanted so that said refractive index-variation portions are spaced apart from each other in the direction of the central axis of said optical waveguide and the spacing and the number of said refractive index-variation portions corresponds to properties, which are to be imparted to said grating.

According to such a feature, it is possible to obtain the grating having a high efficiency with a simple structure.

With respect to the above-mentioned apparatus of the present invention, in said implantation device, said ions may be implanted so that each of said plurality of refractive index-variation portions is formed in a plane perpendicular to the central axis of said optical waveguide in said core.

According to such a feature, it is possible to obtain the grating having a high efficiency and a simpler structure.

In the above-mentioned apparatus of the present invention, the grating to be formed is a Bragg grating. In this case, it is possible to form the Bragg grating having high efficiency even in the core formed of any material.

In the above-mentioned apparatus of the present invention, the grating to be formed is a long-period grating. In this case, it is possible to form the long-period grating having high efficiency even in the core formed of any material.

In the above-mentioned apparatus of the present invention, the ions to be implanted may comprise protons.

With respect to this feature, it is necessary to cause the ions to pass through the cladding of the optical waveguide to reach the core, in order to form the refractive index-variation portions in the core by means of ion implantation. Protons have a penetration depth, by which the ions penetrate into material during the ion implantation step, which depth is largest among all the ions under the constant accelerated energy. It is therefore possible to cause the ions to reach the core by small acceleration energy, thus permitting to form effectively the grating.

In the above-mentioned apparatus of the present invention, the ions to be implanted may comprise helium ions.

With respect to this feature, the helium ions have the next largest penetration depth to that of protons. It is therefore possible to cause the ions to reach the core by small acceleration energy, thus permitting to form effectively the grating.

Helium ion has a weight, which is four times as much as the weight of proton. Consequently, variation in refractive index caused during the helium ion implantation step is about four times as much as that in refractive index caused during the proton implantation step. It is therefore possible to obtain the refractive index-variation portions having a prescribed rate in change in refractive index by a small amount of ions implanted, thus permitting to effectively form the grating.

In addition, helium ion has an excessively low reactivity. It is therefore possible to form the refractive index-variation portions without causing degradation of the core.

BRIEF DESCRIPTION OF THE DRAWINGS

FIG. 2 is a block diagram illustrating the schematic structure of an ion implantation device of the first embodiment of the present invention;

DETAILED DESCRIPTION OF THE PREFERRED EMBODIMENTS

Now, preferred embodiments of the present invention will be described in detail below with reference to the accompanying drawings.

[I] First Embodiment

The first embodiment of the present invention will be described below with reference to FIGS. 1 to 3. In the description of the first embodiment, a grating is formed in the core of an optical fiber.

Figure 1A:
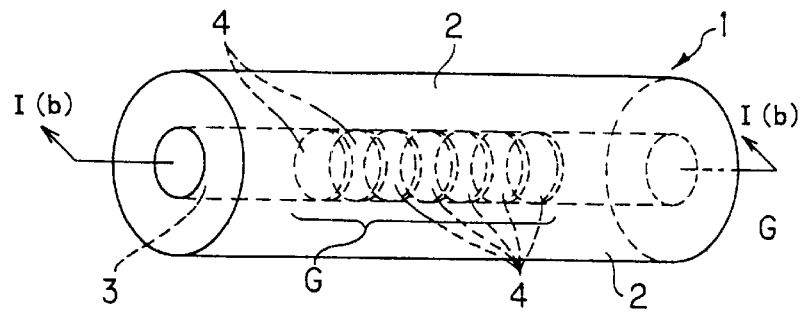
FIG. 1(*a*) is a perspective view illustrating a structure of an optical fiber of the first embodiment of the present invention, FIG. 1(*b*) is a cross-sectional view cut along the line I(*b*)—I(*b*) in FIG. 1(*a*), FIG. 1(*c*) is a cross-sectional view cut along the line I(*c*)—I(*c*) in FIG. 1(*b*) and FIG. 1(*d*) is a cross-sectional view cut along the line I(*d*)—I(*d*) in FIG. 1(*b*)
Figure 1B:
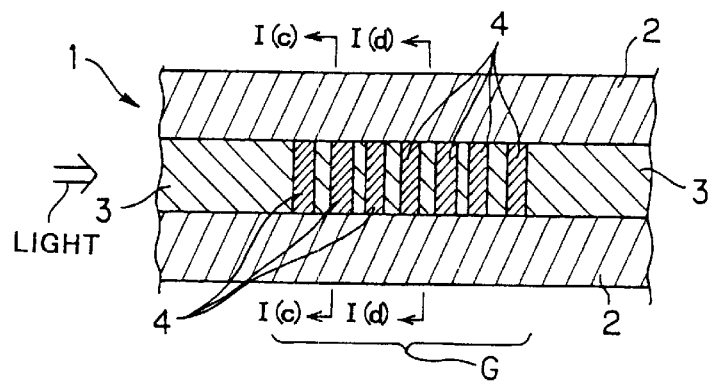
Figure 1C:
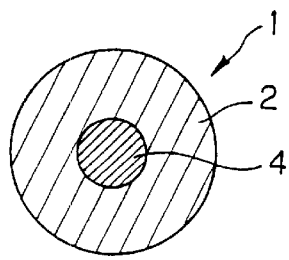
Figure 1D:
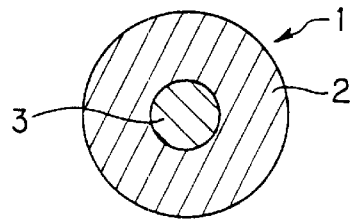

First, the structure of the grating of the first embodiment will be described with reference to FIG. 1. FIG. 1(a) is a perspective view illustrating the entire structure of the optical fiber, FIG. 1(b) is a cross-sectional view cut along the line I(b)—I(b) in FIG. 1(a), FIG. 1(c) is a cross-sectional view cut along the line I(c)—I(c) in FIG. 1(b) and FIG. 1(d) is a cross-sectional view cut along the line I(d)—I(d) in FIG. 1(b)

As shown in FIG. 1(a), the optical fiber 1 is composed of a core 3 and a cladding 2. The core 3 has a cylindrical shape, which is coaxial with the central axis of the optical fiber 1. The core 3 transmits light in practice. The cladding 2 has a tubular shape. The cladding 2 encloses the light in the core 3 utilizing difference in refractive index of the cladding 2 from the core 3, to transmit the light.

With respect to material for forming the core 3 and the cladding 2, silica glass ($SiO_2$) is used for example so that these portions formed of it have different refractive index from each other.

The grating G of the present invention is composed of a plurality of refractive index-variation portions 4 that are formed in a plane perpendicular to the central axis of the core 3.

Each of the refractive index-variation portions 4 is formed in the core 3 by implanting ions in the optical fiber 1 in the perpendicular direction to the central axis of the optical fiber 1 and causing the implanted ions to stop in the core 3.

Now, the structure in section of the optical fiber 1 including the grating G will be described with reference to FIGS. 1(b) to 1(d).

As shown in FIGS. 1(b) and 1(c), each of the plurality of refractive index-variation portions 4, which are formed in the respective corresponding places in the core 3 to form the grating G, has a width in a direction of the central axis of the optical fiber 1, which is substantially identical with half of the period of the grating G to be formed.

Material for forming the core 3 is left as it is in a region between the adjacent two refractive index-variation portions 4 as shown in FIG. 1(d).

The distance between the adjacent refractive index-variation portions 4 in the direction of the central axis of the optical fiber 1, i.e., the period of the grating G and a total number of the refractive index-variation portions 4 (i.e., the length of the grating) are determined on the optical properties that are to be imparted to the grating G.

More specifically, in case of the grating serving as the Bragg grating, the period of the grating is determined so as to be substantially identical with the wavelength of light used in an optical communication utilizing the optical fiber 1 (taking a concrete example of about 1 $\mu$m). On the contrary, in case of the grating serving as the long-period grating, the period of the grating is determined so as to be remarkably longer than the wavelength of the above-mentioned light, for example, within a range of from 100 $\mu$mm to 1 mm.

The length of the grating G is determined on the basis of the purpose of the usage of the grating G (for example, light reflection efficiency, a band width of light to be removed by a filter).

Now, description will be given below of the first embodiment of an ion implantation device serving as the grating formation apparatus for forming the grating G in the optical fiber 1, with reference to FIGS. 2 and 3. In the first embodiment, there is described the ion implantation device for forming the respective refractive index-variation portions 4 by implanting helium ions ($He^{2+}$) into the core 3.

First, the entire structure and operation of the ion implantation device of the first embodiment will be described below. FIG. 2 is a block diagram illustrating the schematic structure of the ion implantation device of the first embodiment.

The ion implantation device S of the first embodiment is composed of an ion source 10, a leading electrode 11, a mass spectrograph 12, an accelerating electrode 13 serving as an acceleration device, a quadrupole lens 14 serving as a convergence device, a scanning electrode 15 serving as a passing device and an implantation device, and a mask 16 serving as an implantation device.

Now, operation of the ion implantation device S will be described.

The ion source 10 ionizes vaporous impurities, which are evaporated from a gaseous or solid material including impurities, to generate ions that are to be implanted into the core 3 to form the refractive index-variation portions 4.

The leading electrode 11 to which predetermined negative voltage of 20 k volt to 40 k volt has been impressed, takes the generated ions out of the ion source 10 to form an ion beam IB.

The mass spectrograph 12 takes the required ions (i.e., helium ions in the embodiment) out of the ions that are included in the ion beam IB, which have been taken out by means of the leading electrode 11.

Then, the accelerating electrode 13 accelerates the ion beam IB including the helium ions. An acceleration energy, which is applied to the helium ions by an acceleration voltage applied to the acceleration electrode 13 for the acceleration, is substantially identical with several M electronvolts.

The accelerated ion beam IB is deflected by the quadrupole lens 14 so as to converge in the vicinity of the core 3 and then deflected and scanned in a required direction by means of the scanning electrode 15. Then, the ion beam IB passes through the mask 16 and the cladding 2 of the optical fiber 1 so as to be implanted into the core 3.

In the ion implantation process described above, the acceleration step and the scanning step are carried out in principle in a vacuum.

In the first embodiment, the ion implantation process is carried out in a state that the optical fiber 1 is secured in the same vacuum. It is also possible to take the scanned ion beam IB into air and irradiate it to the optical fiber 1, which is secured in the same air.

It is considered that the formation of the refractive index-variation portions in the core 3 by the ion implantation is principally caused by densification of certain regions ($SiO_2$) of the core 3 into which the ions are implanted to stop in the core 3, and by increase in refractive index of the above-mentioned regions due to the densification mentioned above.

Now, description will be given of relationship between the shape of the mask 16 and the refractive index-variation portions 4 to be formed with reference to FIG. 3.

Figure 3:
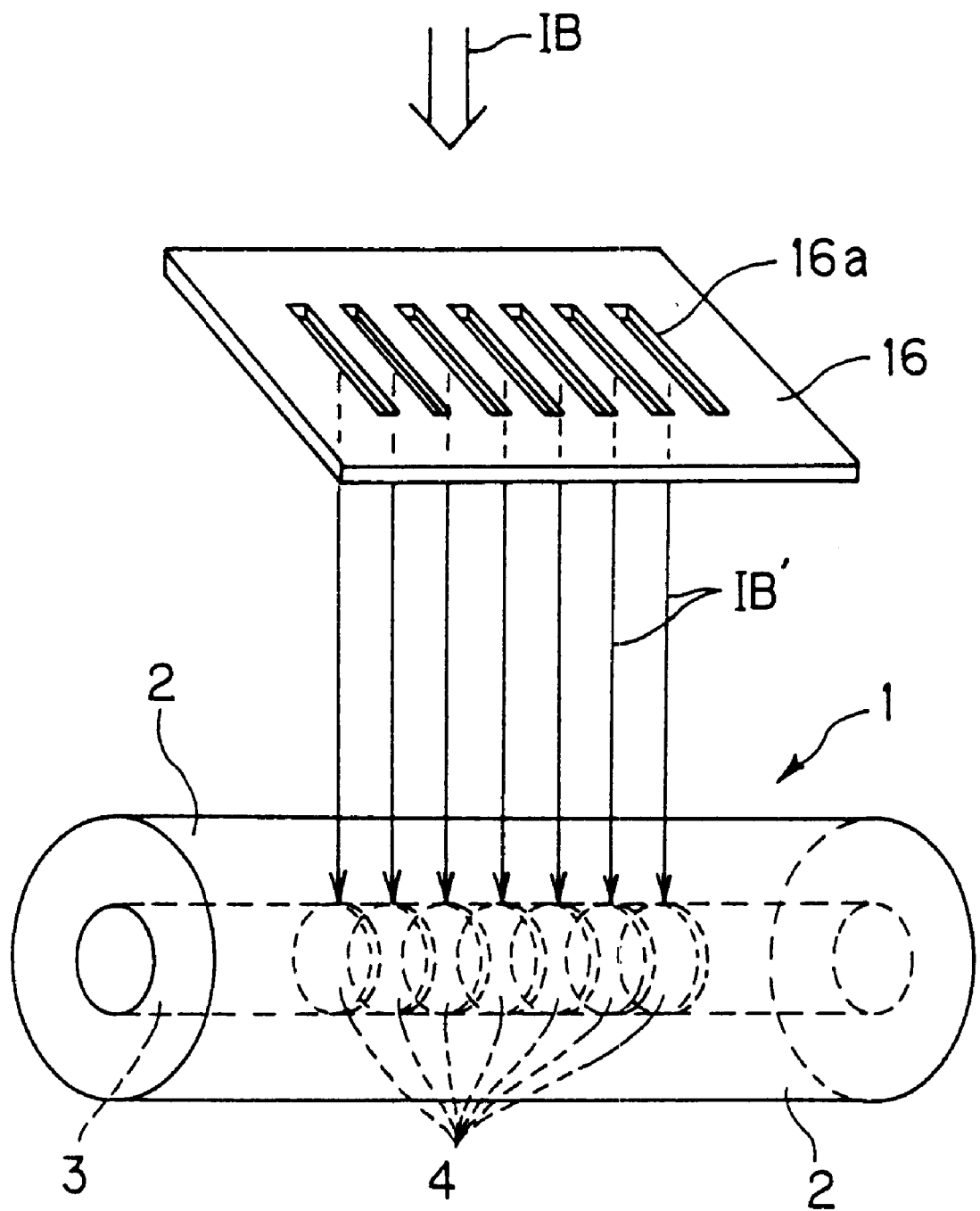
FIG. 3 is a perspective view illustrating the positional relationship between a mask and refractive index-variation portions.

As shown in FIG. 3, the mask 16 that is disposed on a travelling passage of the ion beam IB is provided with slits 16a. The number of the slits 16a corresponds to the number of the refractive index-variation portions 4 to be formed in the core 3. The distance between the adjacent slits 16a also corresponds to the distance between the adjacent refractive index-variation portions 4.

The ion beam IB' passing through the respective slits 16a is implanted into the core 3. As a result, there occurs densification of the above-mentioned regions into which the ions are implanted in a manner as described above to form the prescribed number of refractive index-variation portions 4 that are spaced from each other by a prescribed distance.

With respect to relationship between the projected range of the helium ion in the optical fiber 1 and an acceleration energy, which is applied to the helium ion by an acceleration voltage applied to the acceleration electrode 15, there is an experimental acknowledgement that the acceleration energy of about 5 M electronvolt is required for the helium ion to penetrate by a distance of 20 μm in the optical fiber 1 that is formed of silica glass. The distance of penetration of the helium ion may however vary at a rate of about 10 to 20 percent due to the density of the silica glass.

In case of the optical fiber 1 provided with the cladding 2 having the thickness of 20 μm, implantation of the helium ion, which is accelerated by an acceleration energy of about 5 M electronvolt, permits to form the refractive index-variation portions 4 in the core 3.

When a heat treatment is applied to the optical fiber 1 actually manufactured, after the completion of formation of the grating G through the ion implantation, it is possible to restore the atomic arrangement that has been disturbed by the ion implantation, thus leading to improvement in transmission efficiency of the optical fiber 1.

The grating B that is formed with the use of the ion implantation device S of the first embodiment is composed of the plurality of refractive index-variation portions 4, which are formed by implanting the ions into the core 3. It is therefore possible to increase the refractive index variation rate in the refractive index-variation portions 4. Improving optical reflectance or coupling efficiency between modes in the refractive index-variation portions 4 can provide a high efficiency of the grating G.

There is an experimental acknowledgement that the grating G formed by the method of the present invention has a long service life and a high temperature resistance in comparison with a grating formed by the conventional laser irradiation. It is considered that change in refractive index utilizing the ion implantation is principally caused by densification utilizing the ion implantation in material for the optical fiber 1, and that induced density change is stable relative to heat in comparison with the point defects that are induced by the conventional laser beam irradiation and it is therefore possible to increase the service life of the grating G and impart a high temperature resistance to it.

The refractive index-variation portions 4 are spaced apart from each other in the direction of the central axis of the optical fiber 1 and the spacing and the number of the refractive index-variation portions 4 corresponds to properties, which are to be imparted to the grating G. It is possible to obtain the grating G having a high efficiency with a simple structure.

Each of the refractive index-variation portions 4 is formed in a plane perpendicular to the central axis of the optical fiber 1 in the core 3. It is possible to obtain the grating G having a high efficiency with a simple structure.

When the grating G is formed as a Bragg grating, it is possible to improve the efficiency as the Bragg grating. On the contrary, when the grating G is formed as a long-period grating, it is possible to improve the efficiency as the long-period grating.

According to the above-mentioned ion implantation device S, the grating G is composed of the plurality of refractive index-variation portions 4, which are formed by implanting the accelerated helium ions into the core 3. It is therefore possible to form effectively the grating G even in an optical fiber 1 having a core, which has a low photosensitivity to the laser beam or no photosensitivity to it.

In the implantation device S, the helium ions are implanted so that the refractive index-variation portions 4 are spaced apart from each other in the direction of the central axis of the optical fiber 1 and the spacing and the number of the refractive index-variation portions 4 corresponds to properties, which are to be imparted to the grating G. It is therefore possible to obtain the grating G having a high efficiency with a simple structure.

In the ion implantation device S, the helium ions are implanted so that each of the refractive index-variation portions 4 is formed in a plane perpendicular to the central axis of the optical fiber 1 in the core 3. It is therefore possible to obtain the grating G having a high efficiency with a simpler structure.

When the grating G is formed as a Bragg grating, it is possible to form the Bragg grating having high efficiency even in the core formed of any material. On the contrary, when the grating G is formed as a long-period grating, it is possible to form the long-period grating having high efficiency even in the core formed of any material.

The refractive index-variation portions are formed through implantation of the helium ions having the next largest penetration depth to that of protons. It is therefore possible to cause the ions to reach the core 3 by small acceleration energy, thus permitting to form effectively the grating G.

Helium ion has a weight, which is four times as much as the weight of proton. Consequently, variation in refractive index caused during the helium ion implantation step is about four times as much as that in refractive index caused during the proton implantation step. It is therefore possible to obtain the refractive index-variation portions 4 having a prescribed rate in change in refractive index by a small amount of ions implanted, thus permitting to effectively form the grating G.

In addition, the helium ion has an excessively low reactivity. It is therefore possible to form the refractive index-variation portions 4 without causing degradation of the core 3.

[II] Second Embodiment

The second embodiment of the present invention will be described below with reference to FIG. 4.

FIG. 4 illustrates a method of the second embodiment of the present invention for forming the grating.

In the first embodiment described above, the ion beam IB is divided into a plurality of portions corresponding to the refractive index-variation portions to be formed, through the mask 16 having the slits 16a, which has a corresponding location to the refractive index-variation portions to be formed in the core 3, and the refractive index-variation portions 4 are formed simultaneously with the use of the divided ion beam IB'. In the second embodiment, the grating is formed with the use of the different method.

The shape and functions of the grating formed in the second embodiment are quite the same as those of the grating G of the first embodiment. The explanation of the first embodiment applies to the second embodiment and description of the structural elements is omitted.

As shown in FIG. 4, in the method of the second embodiment for forming the grating, the refractive index-variation portions 4 are formed by intermittently irradiating an ion beam IB" that is converged so as to have a converged beam diameter of from several tens nanometer to several hundreds μm to implant the helium ions into the core 3, while moving the irradiation position in the direction of the central axis of the optical fiber 1, without using any mask 16.

Figure 4A:
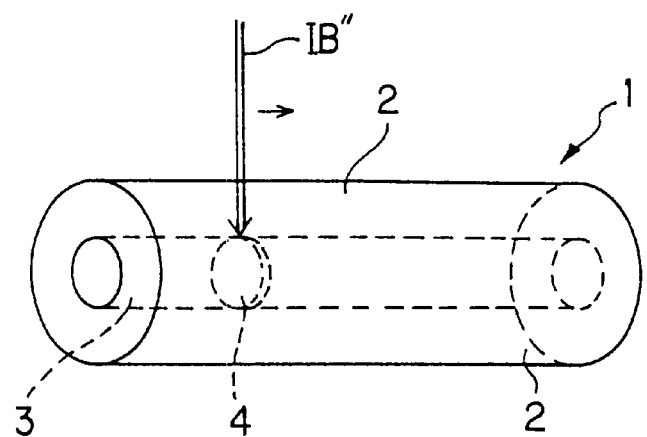
FIG. 4(*a*) is a schematic descriptive view illustrating the first stage of the second embodiment of the method of the present invention for forming the grating, FIG. 4(*b*) is a schematic descriptive view illustrating the other stage of it and FIG. 4(*c*) is a schematic descriptive view illustrating the other stage of it.

More specifically, the first refractive index-variation portion 4 is formed with the use of the converged ion beam IB" as shown in FIG. 4(a).

Figure 4B:
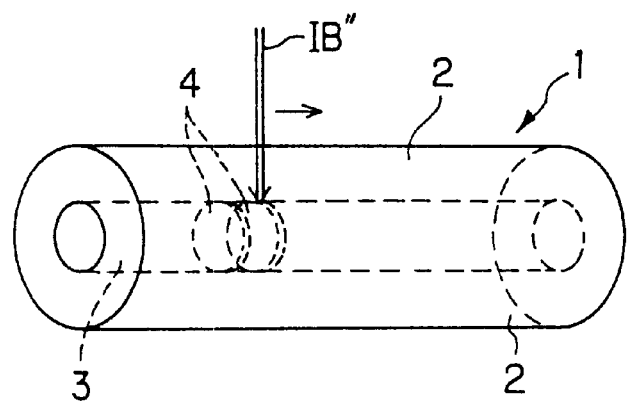

Then, the irradiation of the ion beam IB" is stopped momentarily and the irradiation position is moved in the direction of the central axis of the optical fiber 1 by a distance corresponding to the distance between the adjacent refractive index-variation portions 4 to be formed, as shown in FIG. 4(b). Then, the irradiation of the ion beam IB" is carried out again to form the next refractive index-variation portion 4.

Figure 4C:
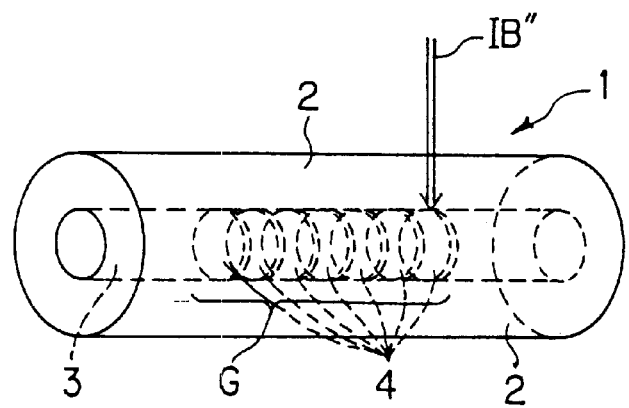

The above-described irradiation operation of the ion beam is intermittently repeated so as to form finally the prescribed number of the refractive index-variation portions 4 in the core 3 as shown in FIG. 4(c).

The movement of the irradiation position of the ion beam IB" as shown in FIG. 4 can be achieved by controlling the voltage, which is impressed to the scanning electrode 15 as shown in FIG. 2.

The method for forming the grating in the second embodiment can provide the same effects as those of the first embodiment.

[III] Modified Embodiment

Now, the modified embodiment of the present invention will be described below with reference to FIG. 5.

In each of the first and second embodiments, the grating G is formed in the core 3 of the optical fiber 1. According to the applied invention, it is also possible to form a grating in a core for an ordinary optical waveguide other than the optical fiber 1.

Figure 5A:
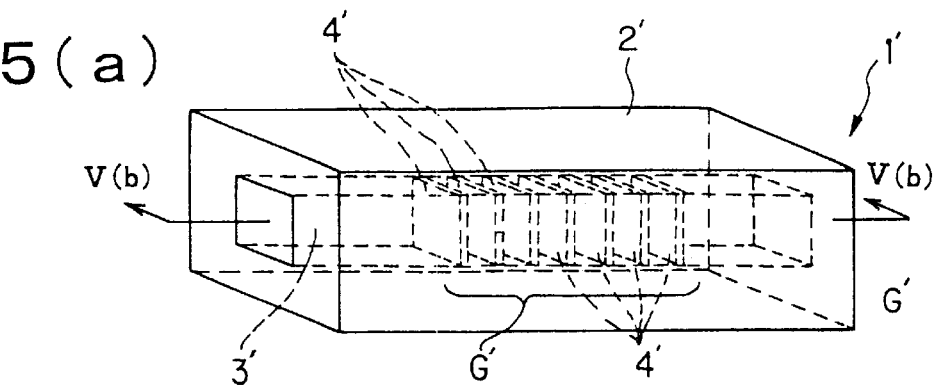
FIG. 5(*a*) is a perspective view illustrating a structure of the optical waveguide in the modified embodiment of the present invention, FIG. 5(*b*) is a cross-sectional view cut along the line V(*b*)—V(*b*) in FIG. 5(*a*), FIG. 5(*c*) is a cross-sectional view cut along the line V(*c*)—V(*c*) in FIG. 5(*b*) and FIG. 5(*d*) is a cross-sectional view cut along the line V(*d*)—V(*d*) in FIG. 5(*b*)
Figure 5B:
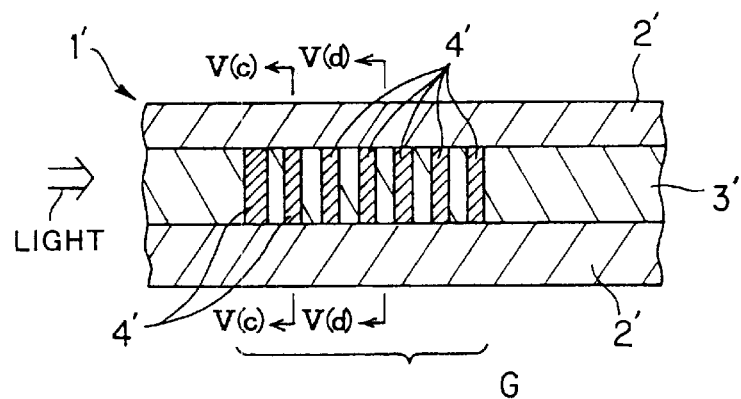
Figure 5C:
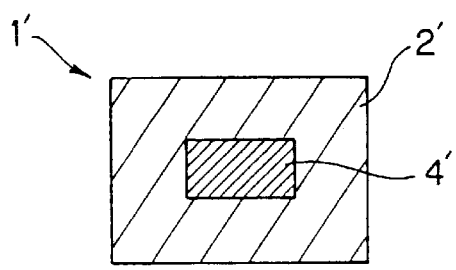
Figure 5D:
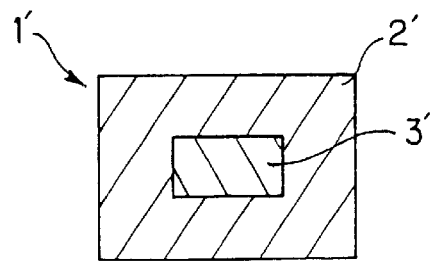

Now, description will be given of the structure of the grating of the modified embodiment of the present invention with reference to FIG. 5. FIG. 5(a) is a perspective view illustrating the entire structure of the optical waveguide in which the grating is formed, FIG. 5(b) is a cross-sectional view cut along the line V(b)—V(b) in FIG. 5(a), FIG. 5(c) is a cross-sectional view cut along the line V(c)—V(c) in FIG. 5(b) and FIG. 5(d) is a cross-sectional view cut along the line V(d)—V(d) in FIG. 5(b).

As shown in FIG. 5(a), the optical waveguide 1' is composed of a core 3' and a cladding 2'. The core 3' has a prism-shape, which is coaxial with the central axis of the optical waveguide 1'. The core 3' transmits light in practice. The cladding 2' has a tubular prism-shape. The cladding 2' encloses the light in the core 3' utilizing difference in refractive index of the cladding 2' from the core 3', to transmit the light.

With respect to material for forming the core 3' and the cladding 2', silica glass ($SiO_2$) is used for example so that these portions formed of it have different refractive index from each other, in the same manner as the core 3 and the cladding 2 of the first and second embodiments described above.

The grating G' of the modified embodiment is composed of a plurality of refractive index-variation portions 4' that are formed in a plane perpendicular to the central axis of the core 3'.

Each of the refractive index-variation portions 4' is formed in the core 3' by implanting ions in the optical waveguide 1' in the perpendicular direction to the central axis of the optical waveguide 1' and causing the implanted ions to stop in the core 3' in the same manner as the first and second embodiments described above.

Now, the structure in section of the optical waveguide 1' including the grating G' will be described with reference to FIGS. 5(b) to 5(d).

As shown in FIGS. 5(b) and 5(c), each of the plurality of refractive index-variation portions 4, which are formed in the respective corresponding places in the core 3' to form the grating G', has a width in a direction of the central axis of the optical waveguide 1', which is substantially identical with half of the period of the grating G' to be formed.

Material for forming the core 3' is left as it is in a region between the adjacent two refractive index-variation portions 4', 4' as shown in FIG. 5(d).

The distance between the adjacent refractive index-variation portions 4' in the direction of the central axis of the optical waveguide 1', i.e., the period of the grating G' and a total number of the refractive index-variation portions 4' are determined on the optical properties that are to be imparted to the grating G' in the same manner as the first and second embodiments described above.

The length of the grating G' is determined on the basis of the purpose of the usage of the grating G' in the same manner as the first and second embodiments described above.

The grating G' formed in the optical waveguide 1' as shown in FIG. 5 and the method for forming the grating G' in the modified embodiment can provide the same effects as those of the first and second embodiments described above.

In the first and second embodiments and the modified embodiments described above, helium ion is used as the implanted ion. It is possible to use proton ($H^+$) as the implanted ion in replacement of the helium ion to form the same refractive index-variation portions 4 or 4' as in the above-described embodiments in the core 3 or 3'.

With respect to an acceleration energy for the ion implantation, there is an experimental acknowledgement that the acceleration energy of about 2.4 M electronvolt is required for the proton to penetrate by a distance of about 55 μm in the optical fiber 1 that is formed of silica glass. The distance of penetration of the hydrogen ion may however vary at a rate of about 10 to 20 percent due to the density of the silica glass.

With respect to the proton serving as the implanted ion, the proton has a penetration depth, by which the ion penetrates into material during the ion implantation step, which depth is largest among all the ions under the constant accelerated energy. It is therefore possible to cause the protons to pass through the cladding 2 or 2' to reach the core 3 or 3' by small acceleration energy so as to form the refractive index-variation portions 4 or 4', thus permitting to form effectively the grating G or G'.

In the first and second embodiments and the modified embodiment described above, the grating G or G' is formed in the optical fiber 1 or the optical waveguide 1', which is formed of silica glass. According to the present invention, it is possible to form the grating in the core even when the optical fiber or the optical waveguide is formed of glass material other than silica glass, or of plastic material.

When the grating is formed in the optical fiber or the optical waveguide, which is formed of plastic material, it is necessary to apply a cooling treatment to the optical fiber during the ion implantation, in order to prevent elevation of temperature due to the ion implantation.

In the first and second embodiments and the modified embodiment described above, the helium ion or the proton is used as the ion to be implanted. According to the present invention, it is also possible to form the grating G or G' in the core 3 or 3' with the use of any other ion, so long as the ion can be implanted through the ion implantation device.

In the first and second embodiments and the modified embodiment described above, the refractive index-variation portions 4 or 4' are formed on a plane perpendicular to the central axis of the optical fiber 1 or the optical waveguide 1' by implanting the ions in the perpendicular direction to the above-mentioned central axis. According to the applied invention, it is also possible to form the refractive index-variation portions 4 or 4' by implanting the ions in a certain angle relative to the above-mentioned central axis, so long as the refractive index-variation portions 4 or 4' inclined by the above-mentioned certain angle serve as the grating G or G' in an appropriate manner.

EXAMPLE

Helium ions accelerated by an acceleration energy of 5.1 M electronvolt were implanted through a mask 16 into an optical fiber 1 formed of silica glass to prepare a long-period grating. Characteristic properties of the long-period grating thus prepared will be described below with reference to FIG. 6.

The mask 16 had slits 16a each having the width of 60 μm. The distance between the adjacent slits 16a was 110 μm. The cladding 2 of the optical fiber 1 as used has a thickness of 24 μm in the radius direction. The penetration depth of the accelerated helium ion in the silica glass used for the optical fiber 1 was 27 μm. The helium ion was implanted through the cladding 2 into the core 3.

Figure 6:
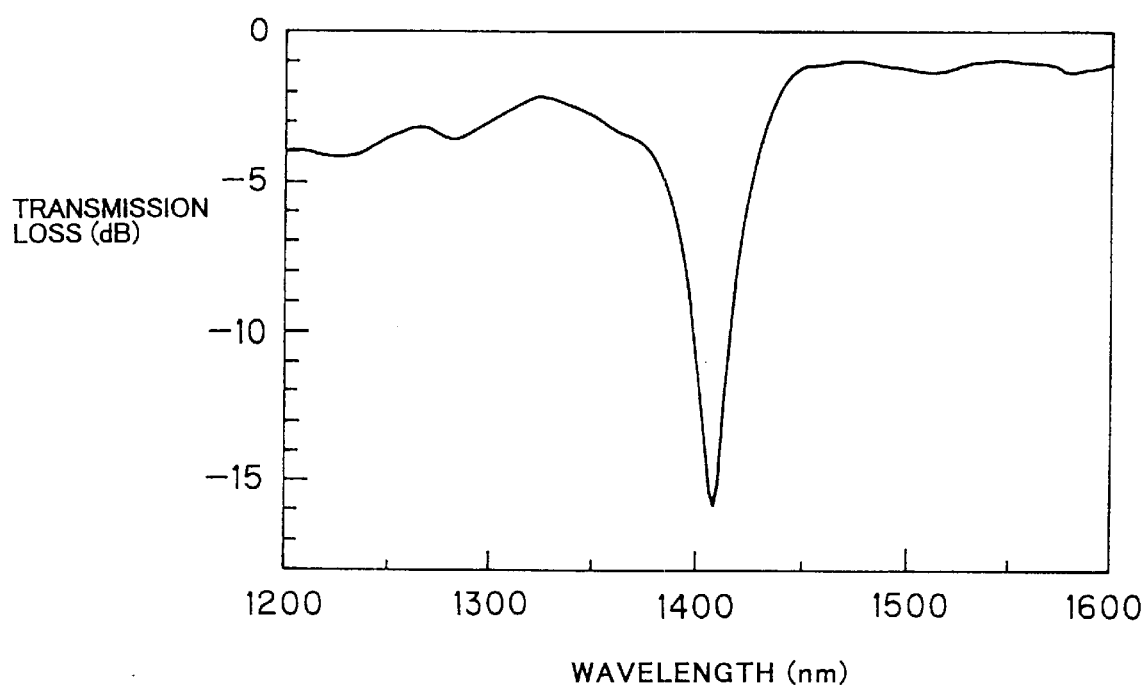
FIG. 6 is a graph illustrating an example of the present invention.

As is clear from FIG. 6, very sharp and effective transmission loss by the prepared long-period grating is observed at about 1,410 μm. It is recognized from this fact that the long-period grating formed through the ion implantation in accordance with the present invention serves as an optical filter for blocking only light having a certain wavelength (about 1.410 μm in FIG. 6).

As a result, it is possible to provide the grating G having a high efficiency in any material for the optical fiber 1 by forming the plurality of refractive index-variation portions 4 through the ion implantation.

According to the present invention as described in detail, the grating is composed of the plurality of refractive index-variation portions, which are formed by implanting ions into the core. It is therefore possible to increase refractive index variation rate in the ion-implanted portions. Improving optical reflectance or coupling efficiency between modes in the refractive index-variation portions can provide a high efficiency of the grating.

Change in refractive index utilizing the ion implantation is principally caused by densification induced by the ion implantation in material for the optical waveguide. The induced densification is stable relative to heat in comparison with the point defects that are induced by the laser beam. It is therefore possible to increase the service life of the grating and impart a high temperature resistance to it.

When the refractive index-variation portions are spaced apart from each other in a direction of the central axis of the optical waveguide and the spacing and the number of the refractive index-variation portions corresponds to properties, which are to be imparted to the grating, it is possible to obtain the grating having a high efficiency with a simple structure.

When the plurality of refractive index-variation portions are formed in a plane perpendicular to the central axis of the optical waveguide in the core, it is possible to obtain the grating having a high efficiency with a simple structure.

When the grating is formed as a Bragg grating, it is possible to improve the efficiency as the Bragg grating.

When the grating is formed as a long-period grating, it is possible to improve the efficiency as the long-period grating.

In the method of the present invention, the grating is composed of the plurality of refractive index-variation portions, which are formed by implanting the accelerated ions into the core. It is therefore possible to form effectively the grating even in the optical waveguide having the core, which has a low photosensitivity to the laser beam or no photosensitivity to it.

The grating is composed of the refractive index-variation portions where the refractive index variation rate is increased. As a result, improving optical reflectance or coupling efficiency between modes in the refractive index-variation portions can provide a high efficiency of the grating. In addition, it is possible to increase the service life of the grating and impart a high temperature resistance to it.

In the other method of the present invention, the grating is composed of the plurality of refractive index-variation portions, which are formed by implanting the accelerated ions into the core. It is therefore possible to form effectively the grating even in the optical waveguide having the core, which has a low photosensitivity to the laser beam or no photosensitivity to it.

The grating is composed of the refractive index-variation portions where the refractive index variation rate is increased. As a result, improving optical reflectance or coupling efficiency between modes in the refractive index-variation portions can provide a high efficiency of the grating. In addition, it is possible to increase the service life of the grating and impart a high temperature resistance to it.

When, in the implantation step, the ions are implanted so that the refractive index-variation portions are spaced apart from each other in the direction of the central axis of the optical waveguide and the spacing and the number of the plurality of refractive index-variation portions corresponds to properties, which are to be imparted to the grating, it is possible to obtain the grating having a high efficiency with a simple structure.

When, in the implanting step, the ions are implanted so that each of the plurality of refractive index-variation portions is formed in a plane perpendicular to the central axis of the optical waveguide in the core, it is possible to obtain the grating having a high efficiency with a simple structure.

When, in the method of the present invention, the grating to be formed is a Bragg grating, it is possible to form the Bragg grating having high efficiency even in the core formed of any material.

When, in the method of the present invention, the grating to be formed is a long-period grating, it is possible to form the long-period grating having high efficiency even in the core formed of any material.

When, in the method of the present invention, the ions to be implanted comprise protons, preferable effects can be provided. With respect to this feature, it is necessary to cause the ions to pass through the cladding of the optical waveguide to reach the core, in order to form the refractive index-variation portions in the core by means of ion implantation. Protons have a penetration depth, by which the ions penetrate into material during the ion implantation step, which depth is largest among all the ions under the constant accelerated energy. It is therefore possible to cause the ions to reach the core by small acceleration energy, thus permitting to form effectively the grating.

When, in the method of the present invention, the ions to be implanted comprise helium ions, preferable effects can be provided. With respect to this feature, helium ions have the next largest penetration depth to that of protons. It is therefore possible to cause the ions to reach the core by small acceleration energy, thus permitting to form effectively the grating.

Helium ion has a weight, which is four times as much as the weight of proton. Consequently, variation in refractive index caused during the helium ion implantation step is about four times as much as that in refractive index caused during the proton implantation step. It is therefore possible to obtain the refractive index-variation portions having a prescribed rate in change in refractive index by a small amount of ions implanted, thus permitting to effectively form the grating.

In addition, helium ion has an excessively low reactivity. It is therefore possible to form the refractive index-variation portions without causing degradation of the core.

In the apparatus of the present invention, the grating is composed of the plurality of refractive index-variation portions, which are formed by implanting the accelerated ions into the core. It is therefore possible to form effectively the grating even in the optical waveguide having the core, which has a low photosensitivity to the laser beam or no photosensitivity to it.

The grating is composed of the plurality of refractive index-variation portions where the refractive index variation rate is increased. As a result, improving optical reflectance or coupling efficiency between modes in the refractive index-variation portions can provide a high efficiency of the grating. In addition, it is possible to increase the service life of the grating and impart a high temperature resistance to it.

In the other apparatus of the present invention, the grating is composed of the plurality of refractive index-variation portions, which are formed by implanting the accelerated ions into the core. It is therefore possible to form effectively the grating even in the optical waveguide having the core, which has a low photosensitivity to the laser beam or no photosensitivity to it.

The grating is composed of the plurality of refractive index-variation portions where the refractive index variation rate is increased. As a result, improving optical reflectance or coupling efficiency between modes in the refractive index-variation portions can provide a high efficiency of the grating. In addition, it is possible to increase the service life of the grating and impart a high temperature resistance to it.

When, in the implantation device, the ions are implanted so that the plurality of refractive index-variation portions are spaced apart from each other in the direction of the central axis of the optical waveguide and the spacing and the number of the plurality of refractive index-variation portions corresponds to properties, which are to be imparted to the grating, it is possible to obtain the grating having a high efficiency with a simple structure.

When, in the implantation device, the ions are implanted so that each of the plurality of refractive index-variation portions is formed in a plane perpendicular to the central axis of the optical waveguide in the core, it is possible to obtain the grating having a high efficiency with a simpler structure.

When, in the apparatus of the present invention, the grating to be formed is a Bragg grating, it is possible to form the Bragg grating having high efficiency even in the core formed of any material.

When, in the apparatus of the present invention, the grating to be formed is a long-period grating, it is possible to form the long-period grating having high efficiency even in the core formed of any material.

When, in the apparatus of the present invention, the ions to be implanted comprise protons, preferable effects can be provided. With respect to this feature, it is necessary to cause the ions to pass through the cladding of the optical waveguide to reach the core, in order to form the refractive index-variation portions in the core by means of ion implantation. Protons have a penetration depth, by which the ions penetrate into material during the ion implantation step, which depth is largest among all the ions under the constant accelerated energy. It is therefore possible to cause the ions to reach the core by small acceleration energy, thus permitting to form effectively the grating.

When, in the apparatus of the present invention, the ions to be implanted comprise helium ions, preferable effects can be provided. With respect to this feature, helium ions have the next largest penetration depth to that of protons. It is therefore possible to cause the ions to reach the core by small acceleration energy, thus permitting to form effectively the grating.

Helium ion has a weight, which is four times as much as the weight of proton. Consequently, variation in refractive index caused during the helium ion implantation step is about four times as much as that in refractive index caused during the proton implantation step. It is therefore possible to obtain the refractive index-variation portions having a prescribed rate in change in refractive index by a small amount of ions implanted, thus permitting to effectively form the grating.

In addition, helium ion has an excessively low reactivity. It is therefore possible to form the refractive index-variation portions without causing degradation of the core.

What is claimed is:

1. A long-period grating formed in a core of an optical waveguide, comprising:

a plurality of refractive index-variation portions that are formed in said core by implanting accelerated ions into said core, wherein said grating is a long-period grating.

2. The grating as claimed in claim 1, wherein:

said plurality of refractive index-variation portions are spaced apart from each other in a direction of the central axis of said optical waveguide and the spacing and the number of said refractive index-variation portions corresponds to properties, which are to be imparted to said grating.

3. The grating as claimed in claim 1, wherein:

each of said plurality of refractive index-variation portions is formed in a plane perpendicular to the central axis of said optical waveguide in said core.

4. A method for forming a long-period grating in a core of an optical waveguide, comprising:

an acceleration step for accelerating ions to provide accelerated ions;

a passing step for causing said accelerated ions to pass through a mask having a shape corresponding to said grating to be formed; and an implantation step for implanting the ions, which have passed through said mask, into said core, to form a plurality of refractive index-variation portions for said grating in said core, wherein said grating is formed as a long-period grating.

5. A method for forming a long-period grating in a core of an optical waveguide, comprising:

an acceleration step for accelerating ions to provide accelerated ions;

a convergence step for converging an ion beam, which is formed of said accelerated ions, to make a beam diameter of said ion beam identical with or smaller than a width of a plurality of refractive index-variation portions for said grating in a direction of the central axis of said optical waveguide so as to provide a converged ion beam; and an implantation step for intermittently irradiating said converged ion beam to said core, while moving an irradiation position in the direction of said central axis, to implant said ions into said core so as to form said plurality of refractive index-variation portions in said core, wherein said grating is formed as a long-period grating.

6. The method as claimed in claim 4, wherein:
in said implantation step, said ions are implanted so that said plurality of refractive index-variation portions are spaced apart from each other in the direction of the central axis of said optical waveguide and the spacing and the number of said refractive index-variation portions corresponds to properties, which are to be imparted to said grating.

7. The method as claimed in claim 4, wherein:
in said implanting step, said ions are implanted so that each of said plurality of refractive index-variation portions is formed in a plane perpendicular to the central axis of said optical waveguide in said core.

8. The method as claimed in claim 5, wherein:
in said implantation step, said ions are implanted so that said plurality of refractive index-variation portions are spaced apart from each other in the direction of the central axis of said optical waveguide and the spacing and the number of said refractive index-variation portions corresponds to properties, which are to be imparted to said grating.

9. The method as claimed in claim 5, wherein:
in said implanting step, said ions are implanted so that each of said plurality of refractive index-variation portions is formed in a plane perpendicular to the central axis of said optical waveguide in said core.

10. An apparatus for forming a long-period grating in a core of an optical waveguide, comprising:
an acceleration device for accelerating ions to provide accelerated ions;
a passing device for causing said accelerated ions to pass through a mask having a shape corresponding to said grating to be formed; and
an implantation device for implanting the ions, which have passed through said mask, into said core, to form a plurality of refractive index-variation portions for said grating in said core,
wherein said grating is a long-period grating.

11. An apparatus for forming a grating in a core of an optical waveguide, comprising:
an acceleration device for accelerating ions to provide accelerated ions;
a convergence device for converging an ion beam, which is formed of said accelerated ions, to make a beam diameter of said ion beam identical with or smaller than a width of a plurality of refractive index-variation portions for said grating in a direction of the central axis of said optical waveguide so as to provide a converged ion beam; and
an implantation device for intermittently irradiating said converged ion beam to said core, while moving an irradiation position in the direction of said central axis, to implant said ions into said core so as to form said plurality of refractive index-variation portions in said core
wherein said grating is a long-period grating., 12. The apparatus as claimed in claim 10, wherein:
in said implantation device, said ions are implanted so that said plurality of refractive index-variation portions are spaced apart from each other in the direction of the central axis of said optical waveguide and the spacing and the number of said refractive index-variation portions corresponds to properties, which are to be imparted to said grating.

13. The apparatus as claimed in claim 10, wherein:
in said implantation device, said ions are implanted so that each of said plurality of refractive index-variation portions is formed in a plane perpendicular to the central axis of said optical waveguide in said core.

14. The apparatus as claimed in claim 11, wherein:
in said implantation device, said ions are implanted so that said plurality of refractive index-variation portions are spaced apart from each other in the direction of the central axis of said optical waveguide and the spacing and the number of said refractive index-variation portions corresponds to properties, which are to be imparted to said grating.

15. The apparatus as claimed in claim 11, wherein:
in said implantation device, said ions are implanted so that each of said plurality of refractive index-variation portions is formed in a plane perpendicular to the central axis of said optical waveguide in said core.

16. A method for forming a grating in a core of an optical waveguide, comprising:
an acceleration step for accelerating protons to provide accelerated protons;
a passing step for causing said accelerated protons to pass through a mask having a shape corresponding to said grating to be formed; and
an implantation step for implanting the protons, which have passed through said mask, into said core, to form a plurality of refractive index-variation portions for said grating in said core.

17. A method for forming a grating in a core of an optical waveguide, comprising:
an acceleration step for accelerating helium ions to provide accelerated helium ions;
a passing step for causing said accelerated helium ions to pass through a mask having a shape corresponding to said grating to be formed; and
an implantation step for implanting the helium ions, which have passed through said mask, into said core, to form a plurality of refractive index-variation portions for said grating in said core.

18. A method for forming a grating in a core of an optical waveguide, comprising:
an acceleration step for accelerating protons to provide accelerated protons;
a convergence step for converging an ion beam, which is formed of said accelerated protons, to make a beam diameter of said ion beam identical with or smaller than a width of a plurality of refractive index-variation portions for said grating in a direction of the central axis of said optical waveguide so as to provide a converged ion beam; and
an implantation step for intermittently irradiating said converged ion beam to said core, while moving an irradiation position in the direction of said central axis, to implant said protons into said core so as to form said plurality of refractive index-variation portions in said core.

19. A method for forming a grating in a core of an optical waveguide, comprising:
- an acceleration step for accelerating helium ions to provide accelerated helium ions;
- a convergence step for converging an ion beam, which is formed of said accelerated helium ions, to make a beam diameter of said ion beam identical with or smaller than a width of a plurality of refractive index-variation portions for said grating in a direction of the central axis of said optical waveguide so as to provide a converged ion beam; and
- an implantation step for intermittently irradiating said converged ion beam to said core, while moving an irradiation position in the direction of said central axis, to implant said helium ions into said core so as to form said plurality of refractive index-variation portions in said core.

20. An apparatus for forming a grating in a core of an optical waveguide, comprising:
- an acceleration device for accelerating protons to provide accelerated protons;
- a passing device for causing said accelerated protons to pass through a mask having a shape corresponding to said grating to be formed; and
- an implantation device for implanting the protons, which have passed through said mask, into said core, to form a plurality of refractive index-variation portions for said grating in said core.

21. An apparatus for forming a grating in a core of an optical waveguide, comprising:
- an acceleration device for accelerating helium ions to provide accelerated helium ions;
- a passing device for causing said accelerated helium ions to pass through a mask having a shape corresponding to said grating to be formed; and
- an implantation device for implanting the helium ions, which have passed through said mask, into said core, to form a plurality of refractive index-variation portions for said grating in said core.

22. An apparatus for forming a grating in a core of an optical waveguide, comprising:
- an acceleration device for accelerating protons to provide accelerated protons;
- a convergence device for converging an ion beam, which is formed of said accelerated protons, to make a beam diameter of said ion beam identical with or smaller than a width of a plurality of refractive index-variation portions for said grating in a direction of the central axis of said optical waveguide so as to provide a converged ion beam, and
- an implantation device for intermittently irradiating said converged ion beam to said core, while moving an irradiation position in the direction of said central axis, to implant said protons into said core so as to form said plurality of refractive index-variation portions in said core.

23. An apparatus for forming a grating in a core of an optical waveguide, comprising:
- an acceleration device for accelerating helium ions to provide accelerated helium ions;
- a convergence device for converging an ion beam, which is formed of said accelerated helium ions, to make a beam diameter of said ion beam identical with or smaller than a width of a plurality of refractive index-variation portions for said grating in a direction of the central axis of said optical waveguide so as to provide a converged ion beam; and
- an implantation device for intermittently irradiating said converged ion beam to said core, which moving an irradiation position in the direction of said central axis, to implant said helium ions into said core so as to form said plurality of refractive index-variation portions in said core.

24. A method for forming a grating in a core of an optical waveguide, comprising the steps of:
- forming a plurality of refractive index-variation portions in said core by implanting accelerated ions into said core, and
- forming said refractive index-variation portions by densification of optical waveguide material due to an ion implantation.

* * * * *